March 6, 1956 A. T. WUPPERMANN 2,737,566
METHOD OF BUTT-WELDING PREHEATED METALLIC WORK PIECES
Filed Dec. 27, 1951
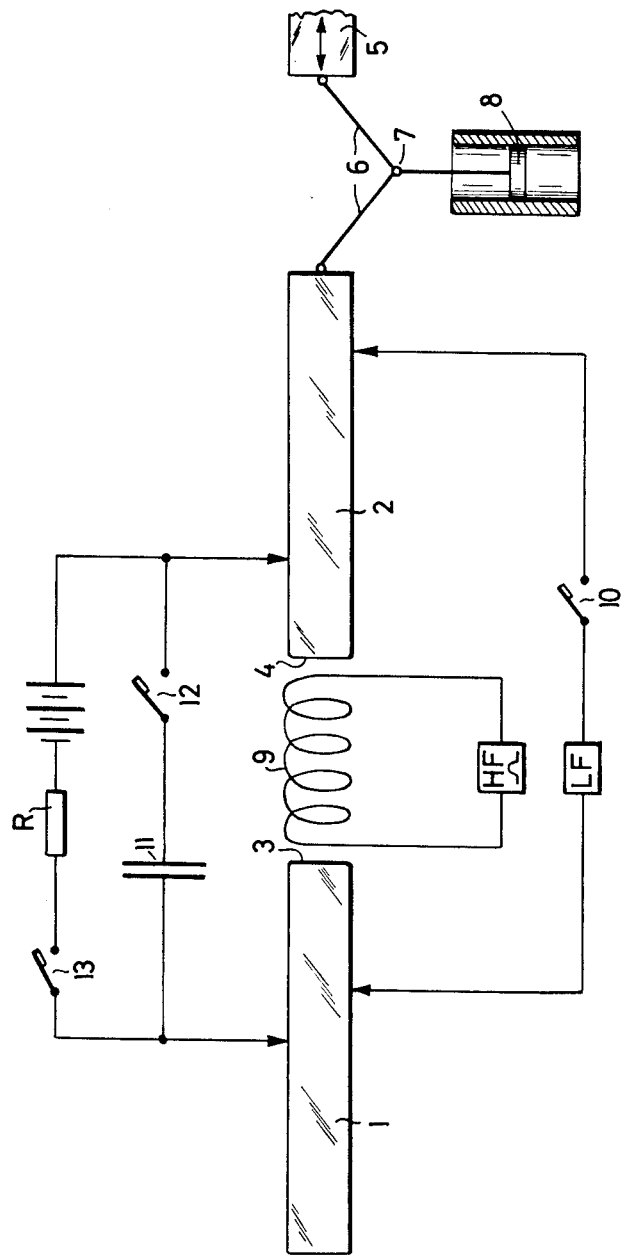
INVENTOR
A. T. Wuppermann
BY
Bryant & Lowry
ATTYS.

United States Patent Office 2,737,566
Patented Mar. 6, 1956

2,737,566

METHOD OF BUTT-WELDING PREHEATED METALLIC WORK PIECES

August Theodor Wuppermann, Leverkusen-Schlebusch, Germany, assignor to Theodor Wuppermann G. m. b. H., Leverkusen-Schlebusch, Germany, a firm Application December 27, 1951, Serial No. 263,532

2 Claims. (Cl. 219—10)

The invention relates to a method of butt-welding electrically preheated metallic work pieces.

When inductive butt-welding is concerned, the preheating treatment often consists in repeatedly connecting the joints under electric current or in closely connecting the surfaces to be welded, whereby a heating of the surfaces to be welded is achieved by conducting very heavy electric current with constant interruptions. This method is applied for the purpose of attaining a steady and equable heating up. Such continuous fluctuating of the current causes, however, considerable current surges within the system. Apart from that, the heating up is relatively inequable. Therefore, a high-capacity transformer is required. Working according to this method is uneconomical, the level of efficiency achieved is rather poor and the output very low. While melting the surfaces to be welded, steadily moving the work pieces against one another, care must be taken, moreover, that the harmful influence of oxygen be eliminated or reduced.

Furthermore, it was suggested that the surfaces to be welded be subjected to electro-inductive heating up and that upon accomplishment of the heating up, the heat-inducing coil be removed from the space between the surfaces to be welded, and this space be reduced to a slit to enable generation of an electric arc. Such an arc was supposed to create the desired inert protective atmosphere. Here it was proceeded with in such a way as to allow the induction circuit to be connected in parallel to that of the electric arc. Such connection, however, did not prove satisfactory as the electric arc was formed either too early or it has just consisted only of single current bridges straying along the welding surface in dependence of the quality of the surface and the heating intensity. The welding was inequable. Apart from that an absolutely protective atmosphere could not be obtained by applying such an arrangement.

It was, moreover, suggested that after the surfaces to be welded have been inductively preheated, they should be welded within a protective atmosphere. For larger surfaces, however, this method turned out to be complicated and expensive. Furthermore, for economical reasons, it is impossible to create an absolutely protective gas atmosphere for any material, being inert throughout the entire temperature range, and to maintain this protective atmosphere during the welding process.

The present invention prevents these disadvantages by subjecting the welding surfaces to a preheating treatment by means of a high-frequency inductor at a voltage adjusted to the size of the surfaces to be welded, and by exposing these surfaces prior to their welding to an electric arc at a voltage just sufficiently high to sustain the arc. It was revealed that by maintaining the electric arc at a low voltage, an upright and steady arc can be obtained, extending equably throughout the entire welding surface and guaranteeing a steady flowing over. When the electric arc equably embraces the welding surface within the period of time until a direct contact is established, any chance of oxygen admittance entailing formation of oxides etc., is absolutely excluded so that the welding surface can be kept within an absolutely inert metallic vapor atmosphere.

The voltage limit depends on the size of the surface to be welded. At least, the voltage is not allowed to exceed that necessary to sustain a steady electric arc. For instance, if surfaces of about 100 cm.$^2$ are concerned, approximately 6 to 10 volts are appropriate.

According to another feature of the invention, the electric arc is sustained at a low voltage and also with a frequency as low as possible. In general the frequency should not exceed 50 cycles; for example, it may be of about 16$\frac{2}{3}$ cycles. The lower the frequency the more advantageous. Therefore, it may even be considerably lower than that stated above. Under these working conditions an accomplished welding can be achieved, for not only can the electric arc be sustained long enough but also an equable distribution extending over the entire surface may be obtained, thus creating a safe protective atmosphere by the vaporizing metal. An accurate melting of the surfaces takes place, causing the metal at the surface to form an absolutely pure fusion.

Since different electric conditions as to frequency, voltage etc. are required for inductive heating up as well as for generating and sustaining the electric arc according to the invention, the current circuits for the inductor and for the electric arc are to be separated.

It is of advantage that the formation of the electric arc be brought about not by connecting the surfaces to be welded, but that the electric arc be ignited preliminarily, prior to the contact of the welding surfaces. Such a preliminary ignition of the electric arc without contact of the welding surfaces favors the chance that under the protective influence of the electric arc proper, sufficient time be gained to achieve accurate melting of the entire surfaces, so that the surfaces will be welded together by sudden upsetting produced by forcing them together.

Ignition of the electric arc can be obtained by means of a special current surge of such an intensity as to achieve overbridging of the slit between the welding surfaces. Such a surge is effected, for example by a condenser discharge. It is also possible that the electric arc be ignited by ionizing within the welding slit, for instance by radiation with proper rays, for example $\beta$-rays.

The duration of sustaining the electric arc between the welding surfaces depends on the surface size and the work piece concerned. The period of time must be at least long enough as to guarantee a pure inert protective atmosphere created by metallic vapor, and moreover, accurate melting of the surfaces so that pure fusion of the metal is obtained at the surface. Thus any prerequisite for proper welding is available.

In order to attain proper ignition, it is necessary that the work pieces be approached up to a separation of a certain closeness and this closeness be adhered to almost exactly.

The ignition voltage must be only sufficiently high to allow overbridging the slit. Moreover, to avoid losses, it is necessary that a quick approaching of the joints occurs from an interval as required for inductive preheating up to the arc-slit. In case of known butt-welding machines, the joints are approached directly, in order that either an upsetting pressure be achieved immediately, or else a contact be achieved for the formation of the electric arc. In both cases the movement is in direct connection with the upsetting procedure.

According to the invention, the surfaces to be welded are brought together from the distance required for the electro-inductive preheating, suddenly and promptly but under definite control to a small predetermined separation for subsequent generation of the electric arc, and only after that, slowly approached closer for the purpose of sustaining the electric arc, and finally pressed together under upsetting pressure. This special motion is improved by interposition of a toggle in the motive device. The toggle is in angular position as long as the space between the joints is rather wide. As soon as the inductor coil is to be removed from the space between the welding surfaces, the toggle is brought into extended position by means of a controlling device etc. This entails a sudden but exactly limited shifting of the joints to an exactly determinate slit.

The use of a toggle for moving workpieces in electric butt-welding machines is of advantage not only with respect to a proper fulfilling of the prerequisites and conditions, but also relative to a simple and facilitated handling. Furthermore, the usual motive mechanism of welding machines need not to be changed, as there is only required a simple connection of the toggle. Apart from that, the toggle in stretched position is adapted, as heretofore, to exert upsetting pressure on the workpieces to be welded, as a toggle in stretched position is rigid and apt to transmit any upsetting pressure. Moreover, it is possible to extend the toggle beyond a dead point position.

The toggle is controllable in any mode whatever. The controlling device joins the toggle at the link and can be operated hydraulically, pneumatically or in any other mechanical way. The controlling device operates preferably in dependence of the swinging-out or removing the heat-conductor coil.

In lieu of the toggle, any other appropriate device may be used, for example a curve gear, an eccentric or similar devices rendering a guarantee for a sudden and exactly adjusted, i. e. a determinate motion.

The accompanying drawing is a schematic representation of the mechanism and circuits by which the method of the present invention may be carried out.

The work pieces 1 and 2 may be held by any well known holding devices, mechanically operated and arranged in such manner that there is a relatively wide space between them for the purpose of heating up, preferably by induction, the opposed workpiece faces 3 and 4. The movable workpiece 2 is guided in a straight path by any suitable guide means (not shown). Between the holder for the workpiece 2 and the upsetting slide 5 a toggle 6 according to the invention is arranged. The controlling mechanism of the toggle joins the pivot 7 of the toggle 6 and can be operated by means of a hydraulic or pneumatic piston 8. First, the space between the faces 3 and 4 is rather wide. For the purpose of generating an electric arc, upon heating up, the workpieces are quickly brought closer together to a small gap of predetermined size by means of the toggle 6. When extended, the toggle forms a rigid bar capable of readily transmitting the upsetting force provided by the upsetting slide 5.

The high frequency induction coil 9 is initially located in the gap between the faces 3 and 4 as shown. The toggle is used to bring these faces under controlled motion into the desired position. Any suitable mechanism may be provided to swing the coil 9 out of the way as the faces 3 and 4 are moved toward each other. When the piston rod has moved up a sufficient amount for initiation of the low-frequency arc, coil 9 will be entirely out of the way and will no longer influence the action. In a mass production operation the coil may remain energized awaiting operation on the following workpieces, or its circuit may be opened when it is swung away. Switch 10 is closed when the faces 3 and 4 are properly spaced for arc initiation, to close the low frequency welding current circuit. The arc may be initiated by a condenser discharge from a condenser such as 11 by closing switch 12 at the same time switch 10 is closed for maintaining the low frequency arc. It will be apparent that other means may readily be designed to carry out applicant's improved welding technique in accordance with the principles above described. Switch 13 is used for completing the condenser charging circuit prior to the initiation of the arc.

It will, of course, be understood that various details of construction may be varied through a wide range without departing from the principles of this invention and it is, therefore, not the purpose to limit the patent granted hereon otherwise than necessitated by the scope of the appended claims.

I claim:

1. That method of butt-welding relatively massive workpieces of substantially full cross-section at the faces to be welded together which consists in aligning said faces at a predetermined distance apart, preheating said faces by relatively high-frequency induction until substantially uniform heating across each entire face is attained, quickly reducing the gap between said faces, and immediately initiating a low-tension arc between the faces at said closer distance to clean the surfaces and to attain uniform welding heat while maintaining a non-oxidizing atmosphere between said faces, causing said faces to approach each other while simultaneously maintaining said relatively low tension arc until contact is attained, and forcing said workpieces together to facilitate fusion of the contacting faces.

2. The method defined in claim 1, wherein the initiation of the low-tension arc is caused by breaking through the gap initially with a sufficiently high-tension discharge, the said low tension being insufficient to initiate the arc though sufficient to maintain it after the initiation.

References Cited in the file of this patent

UNITED STATES PATENTS

| | | |
|---|---|---|
| 423,733 | Coffin | Mar. 18, 1890 |
| 428,459 | Coffin | May 20, 1890 |
| 1,916,013 | Otto et al. | June 27, 1933 |
| 1,976,342 | Heineman | Oct. 9, 1934 |
| 1,978,891 | Blumberg et al. | Oct. 30, 1934 |
| 2,085,583 | Hanson | June 29, 1937 |
| 2,176,103 | Ronay | Oct. 17, 1939 |
| 2,184,534 | Smith et al. | Dec. 26, 1939 |
| 2,235,385 | Rava | Mar. 18, 1941 |
| 2,365,958 | Holslag | Dec. 26, 1944 |
| 2,415,987 | Bissont et al. | Feb. 18, 1947 |
| 2,459,795 | Dawson | Jan. 25, 1949 |

FOREIGN PATENTS

| | | |
|---|---|---|
| 371,165 | Great Britain | Apr. 21, 1932 |